Feb. 16, 1932.  F. ECKERT  1,845,491
APPARATUS FOR FEEDING GLASS
Filed April 25, 1928
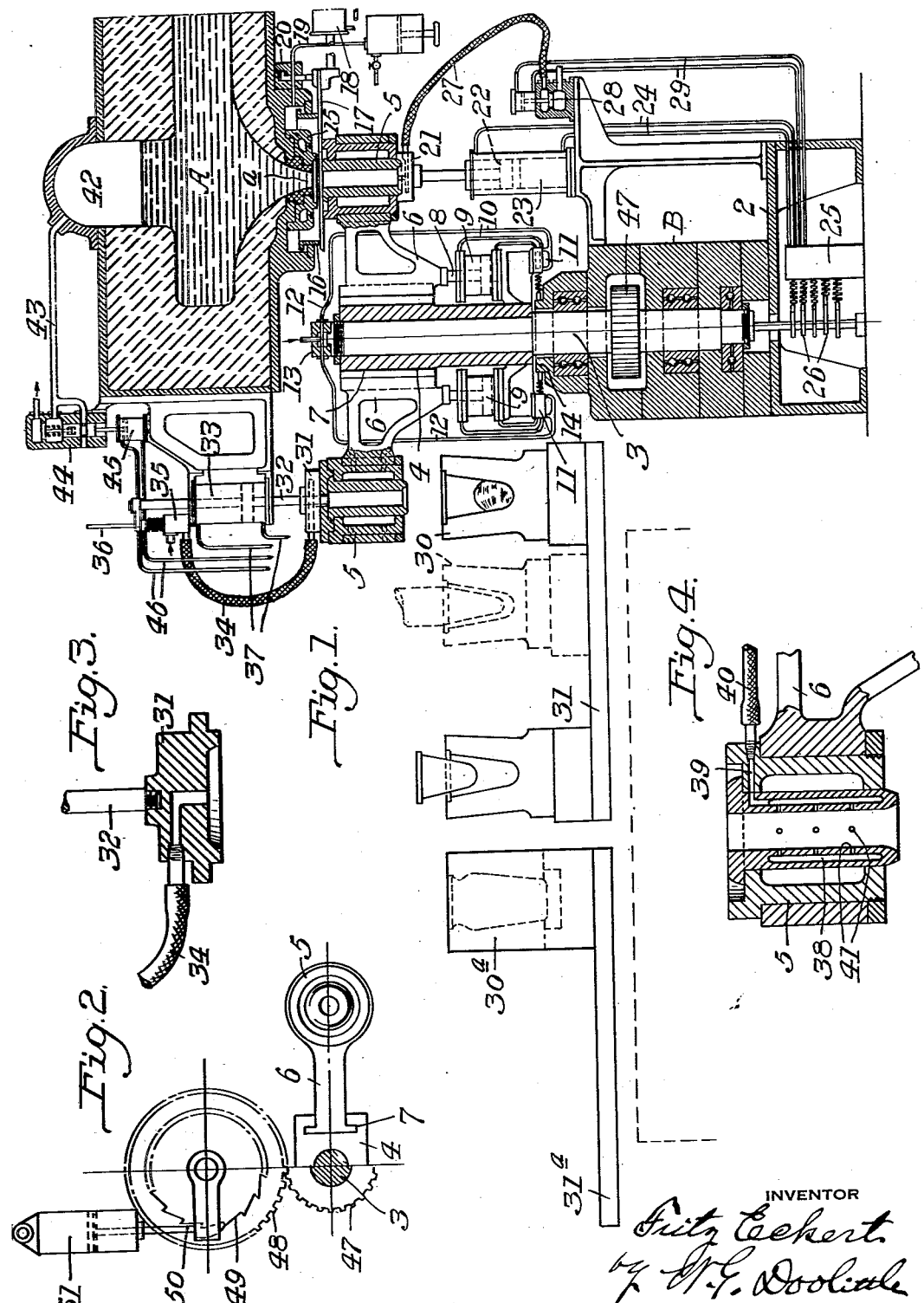
INVENTOR
Fritz Eckert
by W. G. Doolittle
Attorney.

Patented Feb. 16, 1932

1,845,491

UNITED STATES PATENT OFFICE

FRITZ ECKERT, OF BERLIN, GERMANY, ASSIGNOR OF ONE-FOURTH TO WILLIAM A. MORTON AND ONE-FOURTH TO PAUL L. GEER, BOTH OF PITTSBURGH, PENNSYLVANIA, AND ONE-FOURTH TO CARL G. HILGENBERG, OF BALTIMORE, MARYLAND

APPARATUS FOR FEEDING GLASS

Application filed April 25, 1928. Serial No. 272,656.

This invention refers to improvements in method of and apparatus for feeding glass. It has in view to provide means for accurately measuring each mold charge in a receiving and delivering holder whereby to transfer a fixed unit of molten glass from a supply mass to a finishing or other mold.

The invention contemplates the filling and emptying of an intermediate holder by the method and apparatus hereinafter described, with proper timing, etc., for supplying a forming mold independent of gravity flow, condition of the glass as to viscosity, or otherwise, and without restriction as to the particular form or type of the mold or machine to be supplied.

Generally stated, the invention utilizes a measuring mold or gob holder, open at each end, adapted to receive a measured amount from above and to discharge it downwardly through its open bottom, with means effecting filling, closure of either end, retention, and discharge of the unit by fluid pressure, for further treatment, while in a molten or plastic condition.

In the drawings, showing one preferred embodiment of means adapted to carry out the invention:

Fig. 1 is a central vertical sectional view of the apparatus, showing a measuring mold in receiving and discharging position, respectively;

Fig. 2 is a diagrammatic plan view, showing the turret moving means, etc.;

Fig. 3 is a sectional detail view, enlarged, of the fluid supply ejecting header for the measuring mold; and Fig. 4 is an enlarged sectional view of the measuring mold, showing the unit retaining means.

Referring to the drawings, 2 is a supporting base, above which is supported within a suitable ball bearing step-box housing or frame B, a rotatable mast or column 3 carrying the mold supporting turret 4.

A series of vertically adjustable measuring molds 5 are mounted upon the turret, capable of being rotated thereby, with means for raising and lowering each mold individually. A series of such molds are arranged laterally around the turret 4 supported upon vertically movable brackets 6 having a sliding mounting in the turret, as at 7. Each bracket 6 is provided with a stem 8 having a plunger mounted in cylinder 9 for raising and lowering. The plunger is actuated by fluid pressure through connections 10 from a valve 11 and a fluid supply line 12 connected with a common supply header 13, rotatable with the turret around the central mast. Valve 11, for each cylinder, is controlled by a stem extending inwardly and engaging an annular cam 14 at the upper end of the mast supporting housing.

Measuring mold 5 is brought into register with the outlet opening $a$ of a supply well or forehearth A of a tank furnace or other source of supply, having a surrounding contact face within an enclosing vacuum sealing chamber 15 within a surrounding ring 16, as more fully described in my companion application Serial No. 272,655. Measuring mold 5, being raised into contact and register with the outlet opening $a$, is filled with molten glass, then slightly lowered, and the column is severed by shear blade 17 under operation of the plunger of cylinder 18. Air exhausting mechanism for the vacuum chamber may be provided of any suitable construction, as by suction line 19 controlled by valve 20 under reciprocating control of the shear blade.

A suction head 21 in registering relation with the lower end of mold 5 is actuated by plunger 22 of cylinder 23, provided with supply and exhaust connections 24 communicating through valve 25 under the action of a series of cams 26 rotatable with the mast 3. A flexible conduit 27 connects suction head 21 with the casing of a valve 28, similarly controlled through pipes 29 connecting the valve 25 with the plunger cylinder for the valve 28.

As thus arranged, when mold 5 is in receiving position, molten glass will be withdrawn from the forehearth, filling the mold, which is then lowered and released from contact with the suction head 21 by lowering such head, for lateral movement.

At the other side of the turret, in registering position for cooperation with the mold 5 when it is swung around, is a receiving mold 100

30 of a series mounted on a supporting table 31. Mold 30, which may be a press mold of any suitable construction, is arranged to be brought into receiving position below the measuring receiver 5 in any suitable manner, as by the supporting table 31, one such table being arranged adjacent to each machine.

A similar table 31a is provided with a corresponding series of finishing blow molds 30a, together with suitable transfer and other operating means of well known construction, not necessarily herein described.

Mold 5 is adapted to connect with a head 31b for ejection of the measured gob downwardly from the measuring mold into the finishing mold 30. For such purpose, head 31b is vertically adjustable by its stem 32 and an actuating plunger therefor within cylinder 33, mounted outwardly beyond the end of the forehearth, as shown. The lower face of head 31b makes tight closing connection with the upper end of the mold 5, so that when they are brought together, air is supplied through flexible conduit 34 from a valve 35, for ejecting action on the glass within the mold 5. Valve 35 automatically admits pressure as its stem 36 is actuated by lowering plunger 32, so that, immediately upon such contact being established, the measured gob will be ejected. Cylinder 33 is provided with supply and exhaust connections 37 from any suitable controlling mechanism, operating in harmony with the intended cycle of operations of the machine.

In order to maintain the measured charge in suspension within mold 5 as it is swung around from receiving to discharging position, a limited vacuum condition is maintained in the mold by providing an annular chamber 38 in the wall of the inner member of the mold 5, communicating by port 39 with a suction connection 40. Chamber 38 communicates with the interior of the mold by a series of small ports 41, and the suction is terminated simultaneously with the application of ejecting pressure through the head 31, as described.

For the purpose of regulating the atmospheric conditions over the main contents of the forehearth A, it is provided with a closed chamber 42 to and from which air may circulate by conduit 43 from a controlling valve 44. Said valve is under the control of an actuating plunger of cylinder 45 having supply and exhaust connections 46, whereby to effect reduction of atmospheric pressure or re-establishment thereof within the chamber 42, dependent on the conditions of operation.

The molds 5 are adapted to be rotated from their receiving to their delivering positions through one continuous movement or a series of interrupted movements, as preferred, for delivery into each of a series of molds 30, as they are brought into registering position by rotation of the table 31. Rotation of the mast 3 and its mold supporting turret is effected in any suitable manner, as by gears 47—48 and ratchet and pawl mechanism 49—50 under control of the fluid actuated plunger of cylinder 51.

The detail construction of the machine as to its various movements, number and kind of molds, extent of movement, size, or various other detail matters, are entirely within the control of the designing engineer or builder in applying the invention to use. It is understood that, within its application to practical adaptation, for the purpose of withdrawing measured amounts from a supply source and delivering them individually, without variation as to size, to a finishing or other mold, the invention may be utilized and applied quite independently of any particular type or design of any cooperating glass supply or finishing mold construction. The invention provides means for very accurately measuring each unit and for delivering it directly into the finishing mold without variation in size and within accurate control as to time and temperature of the unit.

In operation, each individual measuring mold is brought into direct and close communication with the supply stream of glass, the mold is promptly filled, the intervening column is severed, and, after being brought into register with the finishing mold, is promptly ejected thereinto, the operation being continuously carried out during maintenance of supply.

I claim:

1. In combination with a main glass container having a downwardly delivering outlet opening, a vertically movable measuring holder open at its top and bottom adapted to be brought into receiving register therewith, a vertically movable bottom closing head for the holder, means effecting flow of glass into the holder, means for severing the contents of the holder from the main supply, means for moving the open holder into register with a lower receiving mold, suction means for maintaining the glass in the holder during such movements, and a closing head for the top of the holder having an air pressure connection for ejecting its contents into the receiving mold.

2. In a machine of the class described, a forehearth having a submerged outlet for supplying molten glass charges, said forehearth and the molten glass therein coacting to form a fluid presure chamber, a glass delivering mold having an open top and bottom arranged to contact with said outlet, suction means within the mold and cooperative pressure means within the forehearth to fill said mold, means to withdraw said mold from the forehearth, means for shearing the glass between the mold and forehearth, a forming mold, means for transferring the glass mass independent of horizontal support while in the said open mold into alinement with the forming mold, and a closing head for the top of the delivering mold having an air pressure connection for ejecting glass from said mold to the forming mold.

3. A device of the class described having an open top and an open bottom holder, means for moving said holder in substantially a horizontal plane between two disaligned stations for reception and discharge of glass, said holder having a perforated cylindrical wall to hold the glass, and means for creating a suction through the perforations of said wall to retain the glass in the holder without top and bottom support during said movement.

In testimony whereof I affix my signature.

DR. FRITZ ECKERT.